H. MILLS.
APPLIANCE FOR DRAWING TUBES, RODS, AND THE LIKE.
APPLICATION FILED NOV. 2, 1915.
1,176,589.
Patented Mar. 21, 1916.
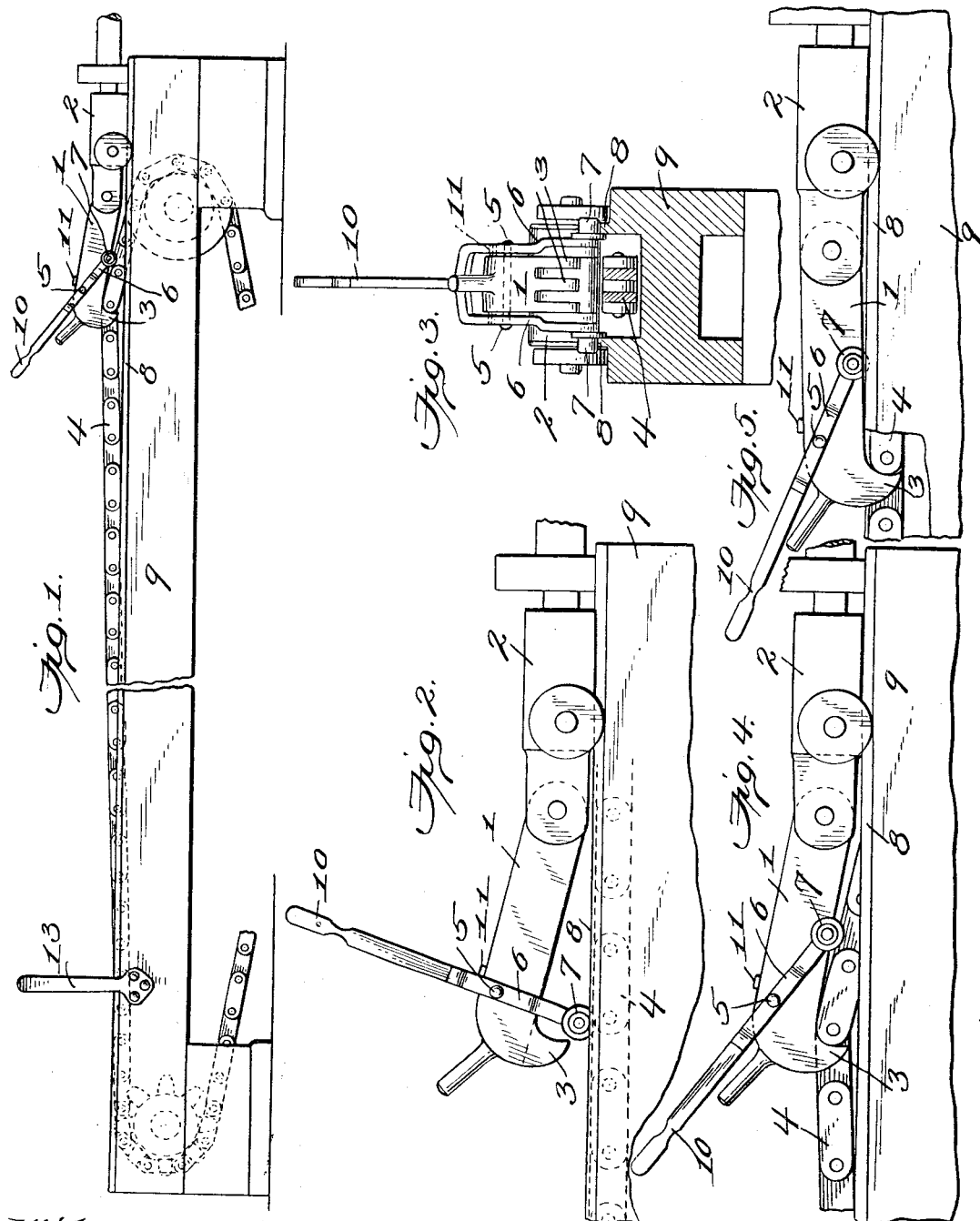
Witnesses:
Inventor
Harry Mills
by
Attorney

UNITED STATES PATENT OFFICE.

HARRY MILLS, OF EDGBASTON BIRMINGHAM, ENGLAND.

APPLIANCE FOR DRAWING TUBES, RODS, AND THE LIKE.

1,176,589.     Specification of Letters Patent.     Patented Mar. 21, 1916.

Application filed November 2, 1915. Serial No. 59,323.

*To all whom it may concern:*

Be it known that I, HARRY MILLS, subject of the King of Great Britain, residing at Edgbaston, Birmingham, England, have invented certain new and useful Improvements in Appliances for Drawing Tubes, Rods, and the like, of which the following is a specification.

This invention relates to draw-bench appliances for use in the manufacture of tubes, rods, and the like, but it has more particular reference to means for engaging and disengaging the dog which connects the draw-carriage or wagon to the endless chain.

Usually the dog, which is hinged to the wagon, is raised out of engagement with the chain directly by a handle at the front. This, however, results in needless exertion for the operator, and in the case of heavy dogs the operator has to mount the bench in order to get a good purchase, which is necessarily attended with considerable danger. When the dog has been lifted it is in a very unstable condition, being liable to be pushed over; and in engaging the dog with the chain, instead of lowering the same, it is the usual practice of the operator to allow the dog simply to drop on to the said chain, but the hammer action of the dog in falling spoils the nose, and the chain soon becomes flanged on to the top, closing the spaces of the chain, thus tending to cause the dog to seize and cause accidents by over-running the sprocket wheel.

The object of the present invention is to facilitate the engagement, and disengagement of the dog by lessening the exertion necessary; to lessen the wear and damage to the dog and chain due to the shock of engagement, and to admit of the use of an automatic safety device for automatically effecting the disengagement of the dog at a suitable position on the bench to prevent over-running the sprocket wheel.

According to the invention the dog has pivoted to it a lever which, when operated, engages with a suitable part of the bed so as to cause the dog to be elevated and maintained at a suitable distance above the chain.

Figure 1 of the accompanying drawings is a side elevation showing the improved means for engaging and disengaging the dog. This view shows the dog engaged with the chain, the latter being under tension. Fig. 2 is a view on a larger scale showing the dog disengaged. Fig. 3 represents a section through the bed, showing the dog in end view and disengaged from the chain. Fig. 4 shows the dog in the position in Fig. 1, but upon a larger scale. Fig. 5 represents the dog in engagement with the chain when the latter is not under tension.

The dog 1 is of the usual type, being pivoted to the draw-carriage or wagon 2, and having a hooked nose 3 adapted to engage with the links of the chain 4. Pivoted to opposite sides of the dog at 5, is a forked lever 6 carrying at the ends of the sides or branches flanged rollers 7 which, when the dog is in engagement with the chain, (see Figs. 1, 4 and 5) are raised clear of the fillets 8, 8, of the bed 9, the lever (which has a central handle 10) assuming an angle to the vertical as shown. The branches of the lever are preferably flanged or cranked outward, as represented in Fig. 3, so as to clear the chain and to carry the rollers at the necessary distance apart to engage the bed.

During the drawing operation the rollers 7 ride clear of the bed owing to the weight of the lever handle and the tension of the chain. When it is desired to disengage the dog (the drawing operation being finished), the lever handle 10 is pulled backward past the vertical, causing the rollers 7 to bear upon the bed and the dog 1 to be lifted just clear of the chain (as in Fig. 2), being retained in this position by the lever engaging with a stop 11 on the dog. To reëngage the dog the lever is turned into its forward position, engaging with the back of the dog and allowing the latter to come into engagement with the chain without shock or damage resulting.

In order to prevent the dog from over-running and fouling the sprocket wheel a safety device can be applied consisting of an arch 13 fixed across the bed at the desired position so that the lever handle 10 impinges against it and is raised sufficient to lift the dog clear of the chain. The arch or disengaging stop 13 can be fitted at any desired point for use when a number of articles of the same length are to be drawn, thus throwing out the dog without attention on the part of the operator.

It is to be understood that I do not limit my invention to use in connection with tube drawing machines or the like, since my invention may find application and be useful in other connections, and certain changes as to the specific construction and arrangement of parts may be resorted to that fall within the scope of the appended claims.

Having fully described my invention, what I desire to claim and secure by Letters Patent is:—

1. In a device of the character described, the combination with a tractor chain, a bed and a carriage movable upon said bed, of a dog pivoted to said carriage and adapted to engage and disengage said chain, and a lever pivoted to said dog and adapted, when operated, to engage with said bed and cause the dog to move into and out of engagement with said chain.

2. In a device of the character described, the combination with a tractor chain, a bed and a carriage movable thereupon, of a dog pivoted to said carriage, a hand lever pivoted intermediate its ends to said dog and adapted to have one end thereof moved to engage said bed whereby said dog is moved out of engagement with said chain, and a stop on said dog to limit the movement of said lever, when moving said dog out of engagement with the chain, and maintaining said dog out of engagement with the latter.

3. In a device of the character described, the combination with a bed, a tractor chain and a carriage movable over said bed, of a dog hinged to said carriage and adapted to engage and disengage said chain, a hand lever pivoted to said dog and adapted to be operated to move said dog into and out of engagement with said chain, and a trip disposed at a predetermined point upon said bed to engage and operate said lever to move said dog out of engagement with said chain.

4. In a device of the character described, the combination with a tractor chain, a bed and a carriage movable upon said bed, of a dog pivoted to said carriage and adapted to normally engage with said chain, and a lever pivoted to said dog and operable to engage said bed to move and support said dog out of engagement with said chain, said lever being in movable engagement with said bed while holding said dog out of engagement with said chain.

5. In a device of the character described, the combination with a tractor chain, a bed and a carriage movable thereover, of a dog pivoted to said carriage and adapted to normally engage with said chain, a hand lever pivoted to said dog and adapted to have one end engaged with said bed and move said dog out of engagement with said chain, and a stop to limit the movement of said lever when moving said dog out of engagement with the chain, and to retain said dog out of engagement with the latter, the end of said lever engaging with said bed being adapted to move relative thereto when said carriage is moved.

6. In a device of the character described, the combination with a tractor chain, a bed and a carriage movable upon said bed, of a dog pivoted to said carriage and adapted to normally engage with said chain, a lever pivoted to said dog and operable to engage said bed to move and support said dog out of engagement with said chain, said lever being in movable engagement with said bed while holding said dog out of engagement with said chain, and a trip disposed at a predetermined point along said bed for automatically operating said lever to move said dog out of engagement with said chain.

7. In a device of the character described, the combination with a bed, a tractor chain movable over said bed and a carriage movable over said bed, of a dog pivoted to said carriage and normally engaging with said chain, whereby said carriage is moved with the latter, a hand lever adapted to straddle said dog and pivoted intermediate its ends to said dog, and rollers carried on the lower extremities of said lever and adapted to engage with said bed when said lever is operated whereby said dog is moved and supported out of engagement with said chain.

8. In a device of the character described, the combination with a bed, a tractor chain movable over said bed and a carriage movable over said bed, of a dog pivoted to said carriage and normally engaging with said chain, whereby said carriage is moved with the latter, a hand lever adapted to straddle said dog and pivoted intermediate its ends to said dog, rollers carried on the lower extremities of said lever and adapted to engage with said bed when said lever is operated whereby said dog is moved and supported out of engagement with said chain, and a trip disposed at a predetermined point along said bed for automatically operating said lever.

In testimony whereof I have hereunto set my hand in presence of two subscribing witnesses.

HARRY MILLS.

Witnesses:
 HENRY NORTON SKERRETT,
 WILLIAM STAILES SKERRETT.